United States Patent
Chiang et al.

(10) Patent No.: US 11,178,195 B2
(45) Date of Patent: Nov. 16, 2021

(54) EXPEDITED RETRANSMISSION DURING CALL SETUP

(71) Applicant: T-Mobile USA, Inc., Bellevue, WA (US)

(72) Inventors: Hsin-Fu Henry Chiang, Bellevue, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/368,633

(22) Filed: Mar. 28, 2019

(65) Prior Publication Data

US 2020/0314155 A1    Oct. 1, 2020

(51) Int. Cl.
| | |
|---|---|
| *H04L 29/06* | (2006.01) |
| *H04L 12/26* | (2006.01) |
| *H04L 5/00* | (2006.01) |
| *H04W 36/14* | (2009.01) |
| *H04L 1/18* | (2006.01) |
| *H04W 36/00* | (2009.01) |

(52) U.S. Cl.
CPC ........ *H04L 65/1069* (2013.01); *H04L 1/1816* (2013.01); *H04L 5/0055* (2013.01); *H04L 43/0864* (2013.01); *H04L 65/1006* (2013.01); *H04W 36/0066* (2013.01); *H04W 36/14* (2013.01)

(58) Field of Classification Search
CPC . H04L 65/1069; H04L 1/1816; H04L 5/0055; H04L 43/0864; H04L 65/1006; H04W 36/0066; H04W 36/14
See application file for complete search history.

(56) References Cited

U.S. PATENT DOCUMENTS

| | | | |
|---|---|---|---|
| 2015/0350971 A1* | 12/2015 | Khay-Ibbat | ....... H04W 36/0022 455/436 |
| 2016/0007239 A1 | 1/2016 | Manepalli et al. | |
| 2017/0367107 A1 | 12/2017 | Comsa et al. | |
| 2018/0054767 A1 | 2/2018 | Gholmieh et al. | |
| 2018/0359660 A1 | 12/2018 | Konappa et al. | |

(Continued)

FOREIGN PATENT DOCUMENTS

EP    3057357 A1    8/2016

OTHER PUBLICATIONS

Rosenberg, J. et al., "SIP: Session Initiation Protocol", RFC 3261, DOI 10.17487/RFC3261, Jun. 2002 (Year: 2002).*

(Continued)

*Primary Examiner* — Eric Myers
(74) *Attorney, Agent, or Firm* — Lee & Hayes, P.C.

(57) ABSTRACT

Systems, devices, and techniques described herein relate to selectively implementing an expedited retransmission time. In some examples, a call setup message is transmitted to a first network system associated with a first network access technology. A transfer request may be received from the first network system. The transfer request may indicate handover or redirection to a second network system associated with a second network access technology. Upon expiration of the expedited retransmission time after receiving the transfer request, the call setup message can be retransmitted to the second network system.

20 Claims, 7 Drawing Sheets

(56) References Cited

U.S. PATENT DOCUMENTS

2019/0159090 A1* 5/2019 Keller .................. H04W 36/12

OTHER PUBLICATIONS

Rosenberg, J. et al., "Reliability of Provisional Responses in Session Initiation Protocol (SIP)", RFC 3262, DOI 10.17487/RFC3262, Jun. 2002 (Year: 2002).*
PCT Search Report and Written Opinion dated Jul. 13, 2020 for PCT Application No. PCT/US2020/024388, 12 pages.

* cited by examiner

EXPEDITED RETRANSMISSION DURING CALL SETUP

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
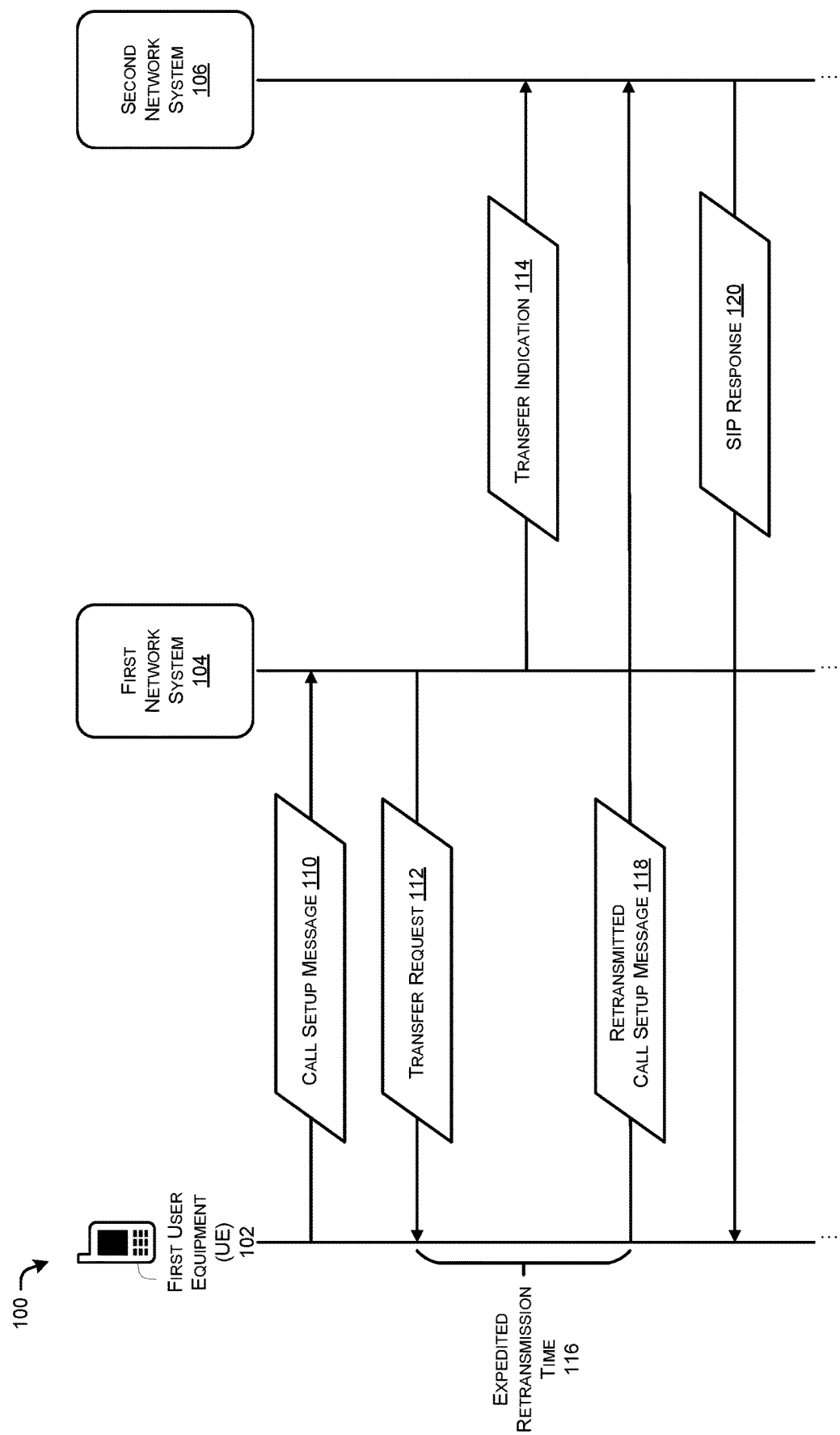
FIG. 1 illustrates an example signaling between a first User Equipment (UE), a first network system, and a second network system.

The systems, devices, and techniques described herein relate to expedited retransmission during a call setup procedure. In various implementations, the expedited retransmission can be initiated when redirection or handover occurs during the call setup procedure.

When a voice call is initiated involving a device connected to a network system, the call is set up by various messages (e.g., Session Initiation Protocol (SIP) messages) that are transmitted between the device and the network system. In some cases, the device and the network system transmit responses (e.g., acknowledgements) to the messages in order to set up the voice call. Once the voice call is set up, the device can receive voice services from the network system.

However, in certain cases, the initial network system cannot finish the voice setup process and hands over or redirects the call to another network system. For example, the device may be moving between two different networks, the first network system may be incapable of providing voice services to the device, or some other event triggering handover or redirection may have occurred.

The handover or redirect procedure may occur after a message is transmitted from the device, but before the initial network system has a chance to transmit a response to the message. In these cases, the device may retransmit the message to the new network system in order to receive the response from the new network system and continue the call setup process.

In various examples, the device waits to retransmit the message after waiting a default retransmission time period without receiving the response. The delay introduced by the default retransmission time period can reduce stress on the network. However, when a message is almost certain to never trigger a response, the default retransmission time period can introduce an unnecessary delay into the call setup process.

According to various implementations of the present disclosure, an expedited retransmission time can be selectively utilized during call setup when the call is transferred between different types of network systems. The expedited retransmission time can be shorter than the default retransmission time, thereby reducing the time required to complete call setup. Furthermore, because the expedited retransmission time can be selectively utilized during a specific scenario when retransmission is likely to be required, significant and additional burdens on the network systems due to the expedited retransmission time can be prevented.

Particular implementations improve the technological field of telecommunications by decreasing call setup times without adding significant burdens to telecommunication networks. Various examples address a particular problem of call setup delay when calls are handed over or redirected during a call setup procedure.

Implementations of the present disclosure include practical applications to the field of telecommunications. In some examples, embodiments can be implemented by one or more devices in a telecommunications network. In particular examples, embodiments can include wirelessly receiving and/or transmitting physical signals. In certain examples, implementations apply to call setup, handover, redirection, and the like.

Various implementations of the present technology are described with reference to FIGS. 1 to 7. In the figures, the left-most digit(s) of a reference number identifies the figure in which the reference number first appears. The use of the same reference numbers in different figures indicates similar or identical items or features.

FIG. 1 illustrates an example signaling 100 between a first User Equipment (UE) 102, a first network system 104, and a second network system 106.

In accordance with various embodiments described herein, the terms "user equipment," "UE," "user device," "wireless communication device," "wireless device," "communication device," "mobile device," and "client device," can be used interchangeably herein to describe any UE (e.g., the first UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future Internet Protocol (IP)-based network technology or evolution of an existing IP-based network technology.

In general, a UE (e.g., the first UE 102) can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

As used herein, the term "network system" can refer to a combination of a radio system and a core system. A single network system can utilize a single type of communication technology, such as a $5^{th}$ Generation (5G) communication technology (e.g., a New Radio (NR)-based technology), a $4^{th}$ Generation (4G) communication technology (e.g., an LTE-based technology), a Wi-Fi communication technology, a Bluetooth communication technology, or the like.

As used herein, the term "radio system" can refer to a system that includes one or more Radio Access Networks (RANs) configured to wirelessly transmit and receive data using wireless resources. In some examples, a radio system can include one or more base stations. For example, a radio system may include a $3^{rd}$ Generation Partnership Project (3GPP) RAN, such a GSM/EDGE RAN (GERAN), a Universal Terrestrial RAN (UTRAN), an evolved UTRAN (E-UTRAN), or a 5G RAN; or alternatively, a "non-3GPP" RAN, such as a Wi-Fi RAN, or another type of wireless local area network (WLAN) that is based on the IEEE 802.11 standards.

As used herein, the term "core system" can refer to a system that includes one or more core network elements configured to carry data between a radio system and at least one external network, such as an IP Media Subsystem (IMS) network, the Internet, or another type of Wide Area Network (WAN). In some examples, a core system can include an Evolved Packet Core (EPC) system, which may include a Mobility Management Entity (MME), a Serving Gateway (SGW), a Packet Data Network (PDN) Gateway (PGW), a Home Subscriber Server (HSS), an Access Network Discovery and Selection Function (ANDSF), and the like. In certain examples, a core system can include a 5G core system, which may include a Session Management Function (SMF), one or more User Plane Functions (UPFs), a Network Exposure Function (NEF), an Authentication Server Function (AUSF), a Network Resource Function (NRF), an Access and Mobility Management Function (AMF), a Policy Control Function (PCF), a Unified Data Management (UDF), an Application Function (AF), and the like.

Referring back to FIG. 1, the first network system 104 may be associated with a first network access technology. In some examples, the first network system 104 may include a radio system including a 5G NR RAN and a core system including a 5G core system. The first network system 104 may be connected to at least one external network, such as an IMS network. In some cases, uplink and downlink data may be exchanged between the first UE 102 and the at least one external network via the first network system 104.

The second network system 106 may be associated with a second network access technology. The second network access technology may be different than the first network access technology. In particular examples, the second network system 106 may include a radio system including a 4G LTE RAN and a core system including an EPC system. The second network system 106 may be connected to the same at least one external network as the first network system 104. In some cases, uplink and downlink data may be exchanged between the first UE 102 and the at least one external network via the second network system 106.

Prior to the signaling 100, a call may be initiated that involves the first UE 102. In some cases, the first UE 102 initiates the call by sending a request (e.g., a Session Initiation Protocol (SIP) INVITE message) to the first network system 104. Accordingly, in some cases, the first UE 102 may be a caller and a different device may be a callee. In particular implementations, the different device initiates the call by sending a request (e.g., a SIP INVITE message) to a different network system that is connected to the external network. Accordingly, in some implementations, the first UE 102 may be the callee and the different device may be the caller.

The first UE 102 may transmit a call setup message 110 to the first network system 104. The call setup message 110 may be one of multiple messages transmitted between the first UE 102 and the first network system 104 as part of a call setup process.

In various implementations, the call setup message 110 may be a SIP message. In some cases, the call setup message 110 can be a provisional acknowledgement (PRACK) message. For instance, the call setup message 110 could be a PRACK message in response to a SIP 180 Ringing message that was previously transmitted to the first UE 102 by the first network system 104. In some cases, the call setup message 110 can include a provisional SIP 183 Session Progress message. In particular implementations, the call setup message 110 may be an acknowledgement (ACK) message in response to a SIP 200 OK message that was transmitted to the first UE 102 by the first network system 104. In certain examples, the call setup message 110 can include an ACK message in response to a SIP 4XX/5XX/6XX error message that was transmitted to the first UE 102 by the first network system 104.

The first UE 102 may expect a message in response to the call setup message 110. In various implementations, the first UE 102 may initiate functionality (e.g., a software module, object, method, program, or the like) to wait a default retransmission time for the message in response to the call setup message 110. In situations in which the first UE 102 does not receive the message within the default retransmission time, the first UE 102 may retransmit the call setup message 110 to the first network system 104. The process of retransmitting the call setup message 110 may prevent the call setup process from extending indefinitely in circumstances in which the call setup message 110 is not received or processed effectively by the first network system 104, is not transmitted effectively to the first UE 102, or is otherwise not responded to. In certain implementations, the default retransmission time is two or more seconds. In some examples, in cases in which the first UE 102 and the first network system 104 are exchanging Transmission Control Protocol (TCP) messages (e.g., the call setup message 110 is a TCP packet), an initial default retransmission time can be defined as two seconds. In some examples, in cases in which the first UE 102 and the first network system 104 are exchanging User Datagram Protocol (UDP) datagram messages (e.g., the call setup message 110 is a UDP datagram), the initial default retransmission time can be defined as two seconds, and can be subsequently incrementally increased to four seconds, eight seconds, sixteen seconds, 32 seconds, 64 seconds, and 128 seconds, in the case of further retransmissions.

The first network system 104 may determine to transfer the call to the second network system 106 during the call setup process. As used herein, the term "transfer" and "call transfer, and their equivalents, can refer to call redirection or handover. In some examples, the first network system 104 may determine that it cannot accommodate the call. In some cases, the first network system 104 may determine that it cannot accommodate a Quality of Service (QoS) policy or Guaranteed Bit Rate (GBR) required for the call. In some examples in which the call is for voice services, the first network system 104 may determine it lacks functionality to accommodate voice services and may decide to transfer the call to a different network system that is capable of accommodating voice services.

In various implementations, the processing of the call setup message 110 and the determining of the call transfer can occur as separate processes. As a result, there may be a racing condition associated with the separate processes. In some implementations, the first network system 104 may determine to transfer the call prior to receiving or processing the call setup message 110. In certain cases, the call setup message 110 may be pending when the first network system 104 initiates transfer of the call.

The first network system 104 may transmit a transfer request 112 to the first UE 102. The transfer request 112 may inform the first UE 102 that the call is being transferred to the second network system 106. The first network system 104 may also transmit a transfer indication 114 to the second network system. The transfer indication 114 may inform the second network system 106 that the call associated with the first UE 102 is being transferred to the second network system 106. However, in some cases, the transfer indication 114 may lack an indication of the pending call setup message 110, e.g., because the first network system 104 may not have received and/or processed the SIP request 110 before transmitting the transfer indication 114.

In various implementations, the transfer request 112 may be received by the first UE 102 prior to the expiration of the default retransmission time. In response to receiving the transfer request 112, the first UE 102 may continue waiting for the response to call setup message 110 for an expedited retransmission time 116. In various implementations, the expedited retransmission time 116 may be shorter than the default retransmission time utilized by the first UE 102. Furthermore, unlike the default retransmission time, the expedited retransmission time may be measured from the time that the first UE 102 receives and/or processes the transfer request 112, not from the time the call setup message 110 was transmitted.

A length of the expedited retransmission time 116 may be determined based on a number of factors. These factors can include one or more of network congestion, a time-of-day at which the transfer request 112 is received, network interference, and the like. In some cases, the length of the expedited retransmission time 116 depends on a single factor. In certain cases, the length of the expedited retransmission time 116 depends on multiple factors. In particular implementations, at least one indication of at least one factor may be included in the transfer request 112. In certain implementations, the UE 102 may derive at least one factor by communicating with the first network system 104, the second network system 106, or both.

In particular implementations, the length of the expedited retransmission time 116 may be selected based on a congestion level of the second network system 106. As used herein, the terms "congestion" or "congestion level," or their equivalents, can refer to how closely one or more network nodes is to carrying more data traffic than it can handle without reducing a quality of service of the data traffic. The congestion level may be defined as a congestion level of one or more nodes in a radio system in the second network system 106, a congestion level of one or more nodes in a core system in the second network system 106, or a combination thereof. In some examples, the length of the expedited retransmission time 116 is selected to be at least partially proportional to the congestion level of the second network system 106, such that the length of the expedited retransmission time 116 is relatively long when the congestion level is relatively high and is relatively short when the congestion level is relatively low. In certain examples, a predetermined short length of the expedited retransmission time 116 is selected when the congestion level is greater than a predetermined threshold, and a predetermined long length of the expedited retransmission time 116 is selected when the congestion level is less than the predetermined threshold.

In certain implementations, the length of the expedited retransmission time 116 may be selected based on a current time-of-day. The term "time-of-day," and its equivalents, as used herein, can refer to a time period that occurs periodically every day. In some cases, a time-of-day can be defined between at least two times on a 24-hour clock in a particular time zone. In some examples, a predetermined short length of the expedited retransmission time 116 is selected when a current time is within a low-traffic time-of-day, such as a time-of-day that is typically associated with low amounts of data traffic traversing the second network system 106 (e.g., between 11 PM and 4 AM). In certain examples, a predetermined long length of the expedited retransmission time 116 is selected when the current time is within a high-traffic time-of-day, such as a time-of-day that is typically associated with high amounts of data traffic traversing the second network system 106 (e.g., between 5 PM and 9 PM).

In particular implementations, the length of the expedited retransmission time 116 may be selected based on an interference level. The interference level can refer to an amount of interference or jamming observed to be within the radio system of the second network system 106, the core system of the second network system 106, or both. In some examples, the length of the expedited retransmission time 116 is selected to be at least partially proportional to the interference level of the second network system 106, such that the length of the expedited retransmission time 116 is relatively long when the interference level is relatively high and the length of the expedited retransmission time 116 is relatively short when the interference level is relatively low. In certain examples, a predetermined short length of the expedited retransmission time 116 is selected when the interference level is greater than a predetermined threshold, and a predetermined long length of the expedited retransmission time 116 is selected when the interference level is less than the predetermined threshold.

In some cases, the expedited retransmission time 116 can be between zero seconds and two seconds. The term "between," as used herein, can be defined inclusively, such that "between A and B" can include A and B. In some examples, the expedited retransmission time 116 is between zero seconds and one second. A predetermined short length of the expedited retransmission time 116 can be, for example, zero seconds. A predetermined long length of the expedited retransmission time 116 can be, for example, one second. In particular implementations, the expedited retransmission time 116 is equivalent to a Round-Trip-Time (RTT) between the first UE 102 and the first network system 104 or a RTT between the first UE 102 and the second network system 106.

In some implementations, upon expiration of the expedited retransmission time 116, the first UE 102 may transmit a retransmitted call setup message 118 to the second network system 106. The retransmitted call setup message 118 may include the same or similar content as the call setup message 110, which was transmitted to the first network system 104.

In some cases, the expedited retransmission time can be applied when a remaining portion of the default retransmission time is longer than the expedited retransmission time. In some examples, if a default retransmission time is x, an expedited retransmission time 116 is y, a time period between transmitting the call setup message 110 and receiving the transfer request 112 is z, and y<x−z, then the first UE 102 may retransmit the call setup message 110 (e.g., as retransmitted call setup message 118) on expiration of the expedited retransmission time 116. However, if y>x−z, then the first UE 102 may retransmit the call setup message 110 on expiration of the default retransmission time. In various examples, the first UE 102 may determine whether y<x-z.

In some cases, the first UE 102 may transmit the retransmitted call setup message 118 after the second network system 106 is aware of the first UE 102. For instance, the first UE 102 may attach to the second network system 106 before the retransmitted call setup message 118 is transmitted. In some cases, prior to transmitting the retransmitted call setup message 118, the first UE 102 may exchange one or more messages that indicate, to the second network system 106, the presence of the first UE 102 and information about the first UE 102.

In response to receiving the retransmitted call setup message 118, the second network system 106 may transmit a call setup response 120 to the first UE 102. The call setup response 120 may be an acknowledgement of the retransmitted call setup message 118. For example, the call setup response 120 may be a SIP 200 OK message.

As a result of the signaling 100 illustrated in FIG. 1, in some embodiments, call setup can continue efficiently when the call is transferred to from the first network system 104 to the second network system 106. In addition, when the expedited retransmission time 116 is shorter than the default retransmission time for the first UE 102, the call setup process can be performed faster than implementations in which the default retransmission time is applied. Further, when a length of the expedited retransmission time 116 is selected based on current network conditions, the expedited retransmission time 116 can be applied without significantly impacting the network.

Figure 2:
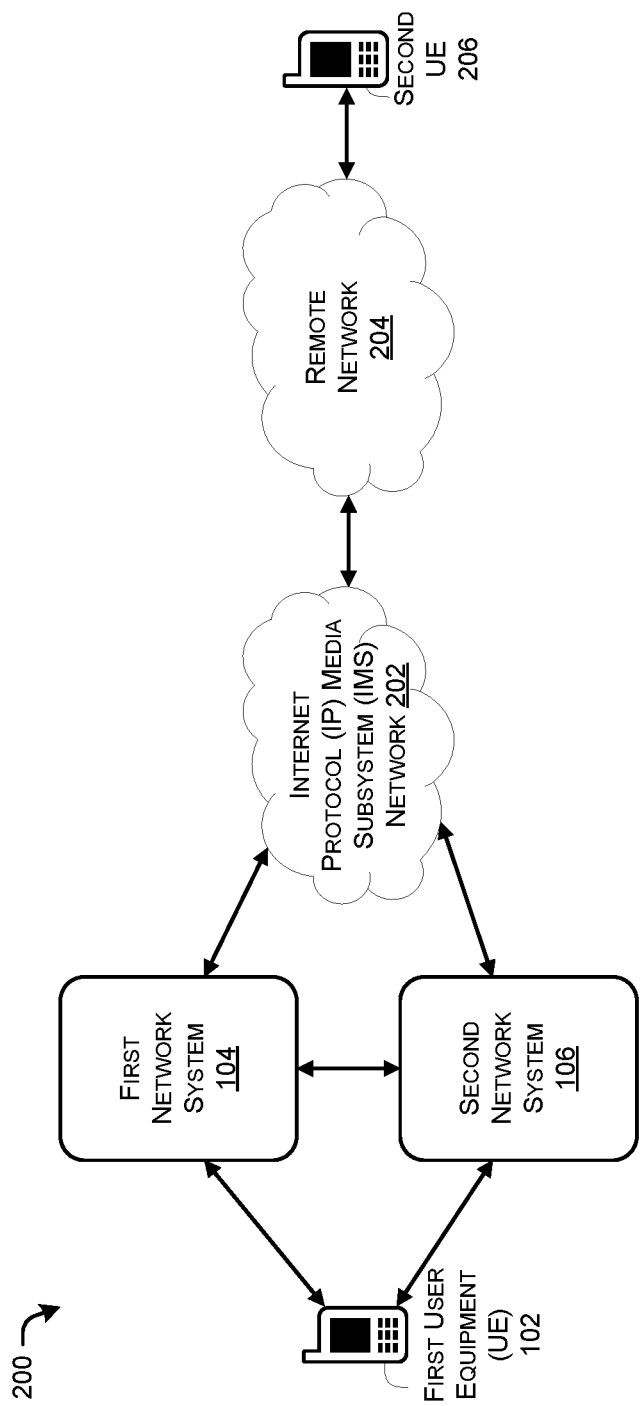
FIG. 2 illustrates an example environment that can implement expedited retransmission during call setup according to various implementations of the present disclosure.

FIG. 2 illustrates an example environment 200 that can implement expedited retransmission during call setup according to various implementations of the present disclosure. As illustrated, the environment 200 can include the first User Equipment (UE) 102, the first network system 104, and the second network system 106 described above with reference to FIG. 1. In addition, the environment 200 may further include an Internet Protocol (IP) Media Subsystem (IMS) network 202, a remote network 204, and a second UE 206.

The IMS network 202 can be used to enable communication between the first UE 102 and other UEs, such as the second UE 206. As used herein, the terms "IMS core network," "IMS network," or "IM CN Subsystem" can be used interchangeably. IMS is an architectural framework defined by the 3rd Generation Partnership Project (3GPP) for delivering IP multimedia to a UE, such as the first UE 102. The IMS network 202 can be maintained and/or operated by one or more service providers, such as one or more wireless carriers ("carriers"), that provide IMS-based services to the first UE 102. For example, a service provider can offer multimedia telephony services that allow a user of the first UE 102 to call or message other users (e.g., a user of the second UE 206) via the IMS network 202. A user can also utilize the first UE 102 to receive, provide, or otherwise interact with various different IMS-based services by accessing the IMS network 202 via the first network system 104 and/or the second network system 106. It is to be appreciated that any number of base stations and/or IMS nodes can be included in the IMS network 202.

Accordingly, an operator of the IMS network 202 can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE (e.g., the first UE 102) may be configured to request establishment of a communication session and to setup the communication session. In the case of telephony services, the communication session can comprise a call (e.g., a voice-based communication session, such as a Voice over LTE (VoLTE) call, a Voice over New Radio (VoNR) call, a Wi-Fi call, or another type of voice-based call). In some cases, a communication session can be associated with one or more Quality of Service (QoS) or Guaranteed Bit Rate (GBR) policies (e.g., requirements). For instance, the call may be set up over a dedicated bearer across one or more networks.

The remote network 204 can connect the IMS network 202 to the second UE 206. According to various implementations, the remote network 204 can be used to enable communication between the second UE 206 and other UEs, such as the first UE 102. In some examples, the remote network 204 includes an IMS network that is external to the IMS network 202. In particular implementations, the remote network 204 can include one or more network systems that can carry services (e.g., voice services) to and from the second UE 206. In certain cases, the remote network 204 may at least partially comprise the Internet. The remote network 204 can include a packet-switched network, a circuit switched network, or a combination thereof.

The second UE 104 may be configured to communicate with the first UE 102 in the form of a communication session. The communication session may be a call between the first UE 102 and the second UE 206. In some examples, the call is initiated by the first UE 102. In other examples, the call is initiated by the second UE 206.

After the call between the first UE 102 and the second UE 206 is initiated, a call setup procedure may ensue. The call setup procedure may include signaling (e.g., the signaling 100 described above with respect to FIG. 1) between the first UE 102, the first network system 104, and the second network system 106. During the call setup procedure, the call may be transferred from the first network system 104 to the second network system 106, and an expedited retransmission time may be implemented.

Once the call has been setup between the first UE 102 and the second UE 206, services (e.g., voice services) may be transmitted between the first UE 102 and the second UE 206 via the IMS network 202 and the remote network 204. In circumstances in which the call has been transferred partially or completely to the second network system 106, the services may be carried through the second network system 106. In some cases, in which the call has been completely transferred to the second network system 106, the first network system 104 does not carry the services between the first UE 102 and the IMS network 202.

According to various implementations of the present disclosure, a call can be efficiently setup between the first UE 102 and the second UE 206, even when the call is transferred to from the first network system 104 to the second network system 106 during call setup.

Figure 3:
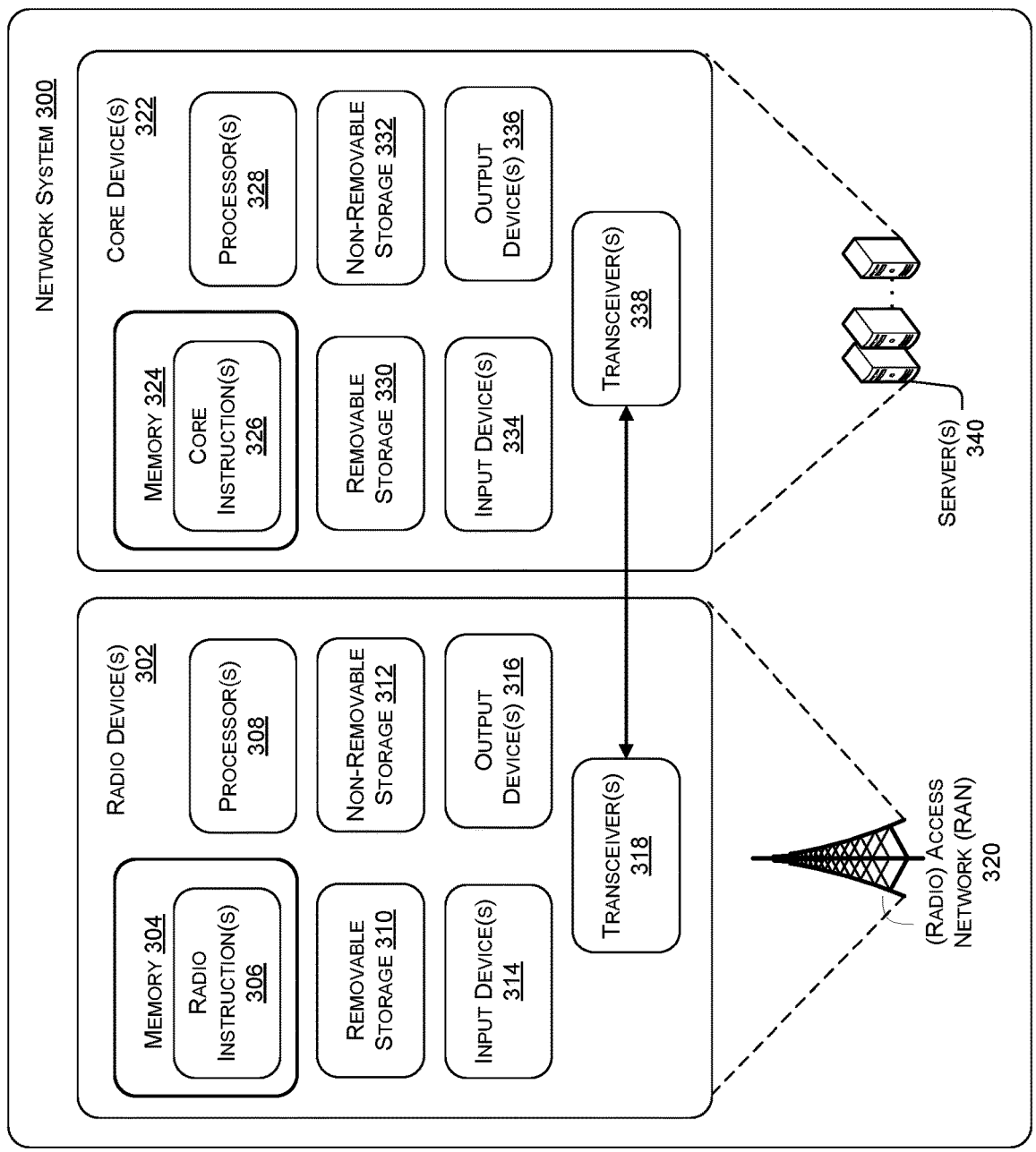
FIG. 3 illustrates a diagram of a network system according to various implementations.

FIG. 3 illustrates a diagram of a network system 300 according to various implementations. In some implementations, the network system 300 is the first network system 104 described above with reference to FIG. 1. In particular implementations, the network system is the second network system 106 described above with reference to FIG. 1.

The network system 300 may include a radio system and a core system. The radio system may include one or more radio devices 302. The core system may include one or more core devices 322.

As illustrated, the radio device(s) 302 comprise a memory 304 storing various radio instructions 306 to provide functionality to the device device(s) to facilitate expedited retransmission during call setup, as described herein. In various embodiments, the memory 304 may also comprise additional functions and structures that are not explicitly described herein. In various implementations, the memory 304 is volatile (such as RAM), non-volatile (such as ROM, flash memory, etc.) or some combination of the two. The radio instructions 306 stored in the memory 304 can comprise methods, threads, processes, applications or any other sort of executable instructions. The radio instructions 306 can also include files and databases.

Also, the radio device(s) 302 include one or more processors 308, a removable storage 310, a non-removable storage 312, one or more input devices 314, one or more output devices 316, and one or more transceivers 318.

In some embodiments, the processor(s) 308 can include a Central Processing Unit (CPU), a Graphics Processing Unit (GPU), or both CPU and GPU, or other processing unit or component known in the art.

The radio device(s) 302 can also include additional data storage devices (removable and/or non-removable) such as, for example, magnetic disks, optical disks, or tape. Such additional storage is illustrated in FIG. 3 by removable storage 310 and non-removable storage 312. Tangible computer-readable media can include volatile and nonvolatile, removable and non-removable media implemented in any method or technology for storage of information, such as computer readable instructions, data structures, program modules, or other data. Memory 304, removable storage 310, and non-removable storage 312 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the radio device(s) 302. Any such tangible computer-readable media can be part of the radio device(s) 302.

The radio device(s) 302 also can include input device(s) 312, such as a keypad, a cursor control, a touch-sensitive display, voice input device, etc., and output device(s) 316 such as a display, speakers, printers, etc. These devices are well known in the art and need not be discussed at length here.

As illustrated in FIG. 3, the radio device(s) 302 can also include one or more wired or wireless transceiver(s) 318. For example, the transceiver(s) 318 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 318 can utilize Multiple-Input/Multiple-Output (MIMO) technology. The transceiver(s) 318 can comprise any sort of wireless transceivers capable of engaging in wireless, Radio Frequency (RF) communication. The transceiver(s) 318 can also include other wireless modems, such as a modem for engaging in Wi-Fi, WiMAX, Bluetooth, or infrared communication.

In some examples, the radio device(s) 302 are implemented as a Radio Access Network (RAN) 320. In various implementations, the RAN 320 may utilize the processor(s) 308, executing the radio instructions 306, to control the transceiver(s) 318 to communicate wirelessly with a User Equipment (UE), such as the first UE 102, via a particular radio access technology. The radio access technology may be any of a Wi-Fi radio access technology, a Bluetooth radio access technology, a Citizen Broadband Radio System (CBRS) radio access technology, a $3^{rd}$ Generation (3G) radio access technology, a $4^{th}$ Generation (4G) radio access technology, a $5^{th}$ Generation (5G) radio access technology, or some other radio access technology capable of supporting services to the UE.

As illustrated, the core device(s) 322 comprise a memory 324 storing various radio instructions 316 to provide functionality to the core device(s) 322 to facilitate expedited retransmission during call setup, as described herein. In various embodiments, the memory 324 may also comprise additional functions and structures that are not explicitly described herein. In various implementations, the memory 324 is volatile (such as RAM), non-volatile (such as ROM, flash memory, etc.) or some combination of the two. The core instructions 326 stored in the memory 334 can comprise methods, threads, processes, applications or any other sort of executable instructions. The core instructions 326 can also include files and databases.

Also, the core device(s) 322 include one or more processors 328, a removable storage 330, a non-removable storage 332, one or more input devices 334, one or more output devices 336, and one or more transceivers 338.

In some embodiments, the processor(s) 328 include a CPU, a GPU, or both CPU and GPU, or other processing unit or component known in the art.

The core device(s) 322 can also include additional data storage devices (removable and/or non-removable) such as, for example, magnetic disks, optical disks, or tape. Such additional storage is illustrated in FIG. 3 by removable storage 330 and non-removable storage 332. Tangible computer-readable media can include volatile and nonvolatile, removable and non-removable media implemented in any method or technology for storage of information, such as computer readable instructions, data structures, program modules, or other data. Memory 324, removable storage 330, and non-removable storage 332 are all examples of computer-readable storage media. Computer-readable storage media include, but are not limited to, RAM, ROM, EEPROM, flash memory or other memory technology, CD-ROM, DVDs, CAM, or other optical storage, magnetic cassettes, magnetic tape, magnetic disk storage or other magnetic storage devices, or any other medium which can be used to store the desired information and which can be accessed by the core device(s) 322. Any such tangible computer-readable media can be part of the core device(s) 322.

The core device(s) 322 also can include input device(s) 334, such as a keypad, a cursor control, a touch-sensitive display, voice input device, etc., and output device(s) 336 such as a display, speakers, printers, etc. These devices are well known in the art and need not be discussed at length here.

As illustrated in FIG. 3, the core device(s) 322 can also include one or more wired or wireless transceiver(s) 338. For example, the transceiver(s) 338 can include a NIC, a network adapter, a LAN adapter, or a physical, virtual, or logical address to connect to the various base stations or networks contemplated herein, for example, or the various user devices and servers. To increase throughput when exchanging wireless data, the transceiver(s) 338 can utilize MIMO technology. The transceiver(s) 338 can comprise any sort of wireless transceivers capable of engaging in wireless, RF communication. The transceiver(s) 338 can also include other wireless modems, such as a modem for engaging in Wi-Fi, WiMAX, Bluetooth, or infrared communication.

In some examples, the core device(s) 322 are implemented as one or more servers 340. In some cases, the core device(s) 322 may be at least a portion of a 4G core network, and the core instructions 326 may implement any of various components of an Evolved Packet Core (EPC), such as any of a Mobility Management Entity (MME), a Serving Gateway (SGW), a Packet Data Network (PDN) Gateway (PGW), a Home Subscriber Server (HSS), an Access Network Discovery and Selection Function (ANDSF), or an evolved Packet Data Gateway (ePDG). In particular cases, the core device(s) 322 may be at least a portion of a 5G core network, and the core instructions 326 may implement any of a Network Slice Selection Function (NSSF), a Network Exposure Function (NEF), a Network Repository Function (NRF), a Policy Control Function (PCF), a Unified Data Management (UDM), an Application Function (AF), an Authentication Server Function (AUSF), an Access and Mobility Management Function (AMF), a Session Management Function (SMF), a User Plane Function (UPF), or a Data Network (DN).

Figure 4:
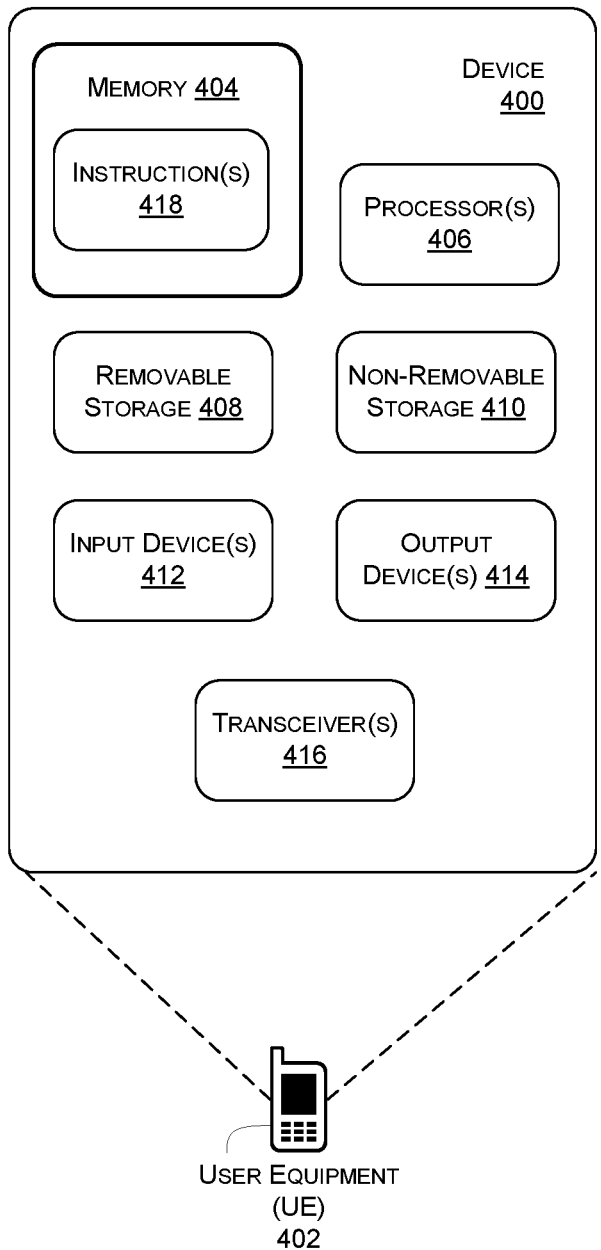
FIG. 4 illustrates a diagram of a device included in a UE according to various implementations.

FIG. 4 illustrates a diagram of a device 400 included in a User Equipment (UE) 402 according to various implementations. In some examples, the UE is the UE 102 described above with reference to FIGS. 1 and 2.

As illustrated, the device 400 comprises a memory 404 storing various instructions 418 to provide functionality to the device 400 to facilitate expedited retransmission during call setup, as described herein. In various embodiments, the memory 404 may also comprise additional functions and structures that are not explicitly described herein. In various implementations, the memory 404 is volatile (such as RAM), non-volatile (such as ROM, flash memory, etc.) or some combination of the two. The instructions 418 stored in the memory 404 can comprise methods, threads, processes, applications or any other sort of executable instructions. The instructions 418 can also include files and databases.

Also, the device 400 includes one or more processors 406, a removable storage 408, a non-removable storage 410, one or more input devices 412, one or more output devices 414, and one or more transceivers 416.

In some embodiments, the processor(s) 406 include a Central Processing Unit (CPU), a Graphics Processing Unit (GPU), or both CPU and GPU, or other processing unit or component known in the art.

The device 400 can also include additional data storage devices (removable and/or non-removable) such as, for example, magnetic disks, optical disks, or tape. Such additional storage is illustrated in FIG. 4 by removable storage 408 and non-removable storage 410. Tangible computer-readable media can include volatile and nonvolatile, removable and non-removable media implemented in any method or technology for storage of information, such as computer readable instructions, data structures, program modules, or other data. Memory 404, removable storage 408, and non-removable storage 410 are all examples of computer-readable storage media. Computer-readable storage media can include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device 400. Any such tangible computer-readable media can be part of the device 400.

The device 400 also can include input device(s) 412, such as a keypad, a cursor control, a touch-sensitive display, voice input device, etc., and output device(s) 414 such as a display, speakers, printers, etc. These devices are well known in the art and need not be discussed at length here.

As illustrated in FIG. 4, device 400 can also include one or more wired or wireless transceiver(s) 416. For example, the transceiver(s) 416 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 416 can utilize Multiple-Input/Multiple-Output (MIMO) technology. The transceiver(s) 416 can comprise any sort of wireless transceivers capable of engaging in wireless, Radio Frequency (RF) communication. The transceiver(s) 416 can also include other wireless modems, such as a modem for engaging in Wi-Fi, WiMAX, Bluetooth, or infrared communication.

According to various implementations, the device 400 may implement various call setup procedures. In particular implementations, the instructions 418 may cause the processor(s) 406 to generate one or more call setup messages. The processor(s) 406 executing the instructions 418 may cause the transceiver(s) 416 to transmit or retransmit the one or more call setup messages to a network system. In some cases, the instructions 418 cause the processor(s) 406 to wait a default retransmission time after transmitting a particular call setup message and to retransmit the call setup message if the default retransmission time expires before a response is received from the network system. In particular implementations, the instructions 418 may cause the processor(s) 406 to wait an expedited retransmission time upon the transceiver(s) 416 receiving a transfer request (e.g., transfer request 112) from the network system. The instructions 418 may further cause the processor(s) 406 to determine one or more network conditions, and to select a length of the expedited retransmission time based on the one or more network conditions. In certain implementations, the processor(s) 406, executing the instructions 418, may cause the transceiver(s) 416 to retransmit the call setup message to a network system to which the call has been transferred upon expiration of the expedited retransmission time.

Figure 5:
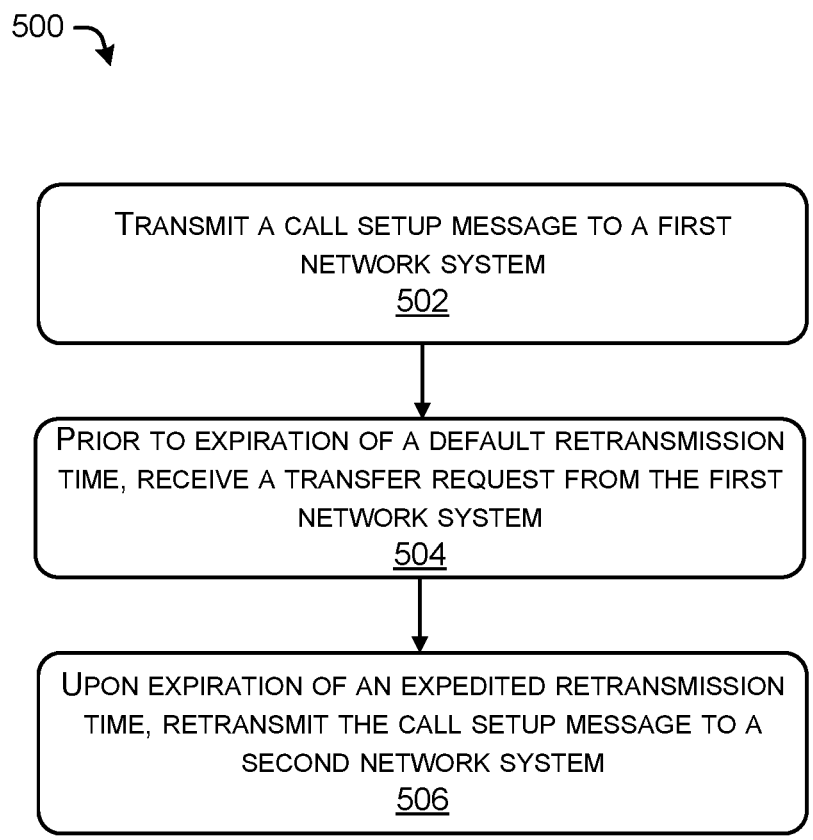
FIG. 5 illustrates a process for implementing an expedited retransmission time during call setup according to various implementations.
Figure 6:
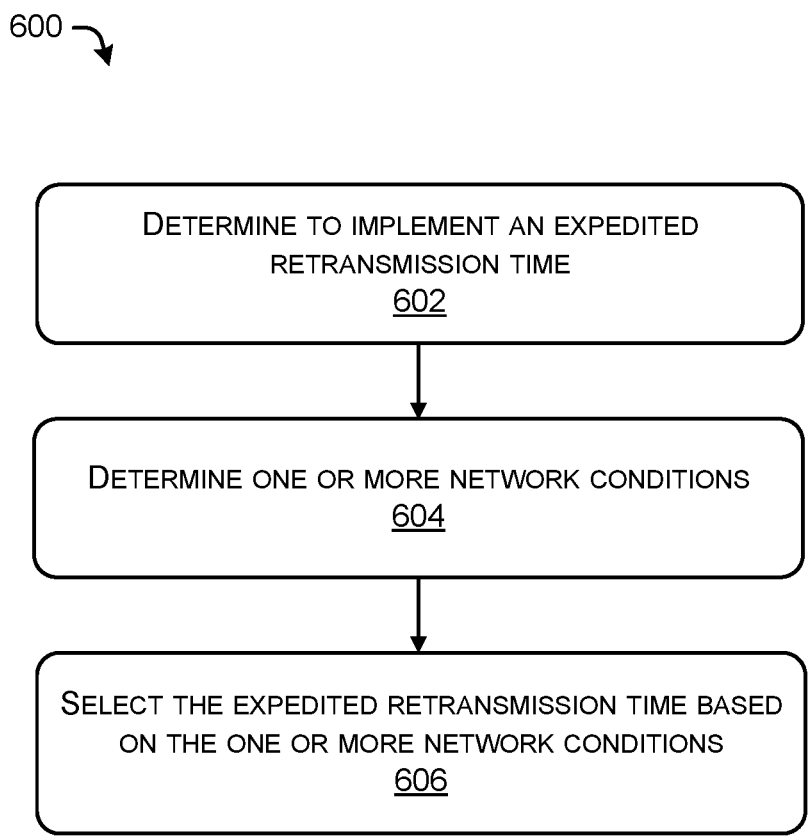
FIG. 6 illustrates a process for selecting an expedited retransmission time according to various implementations.
Figure 7:
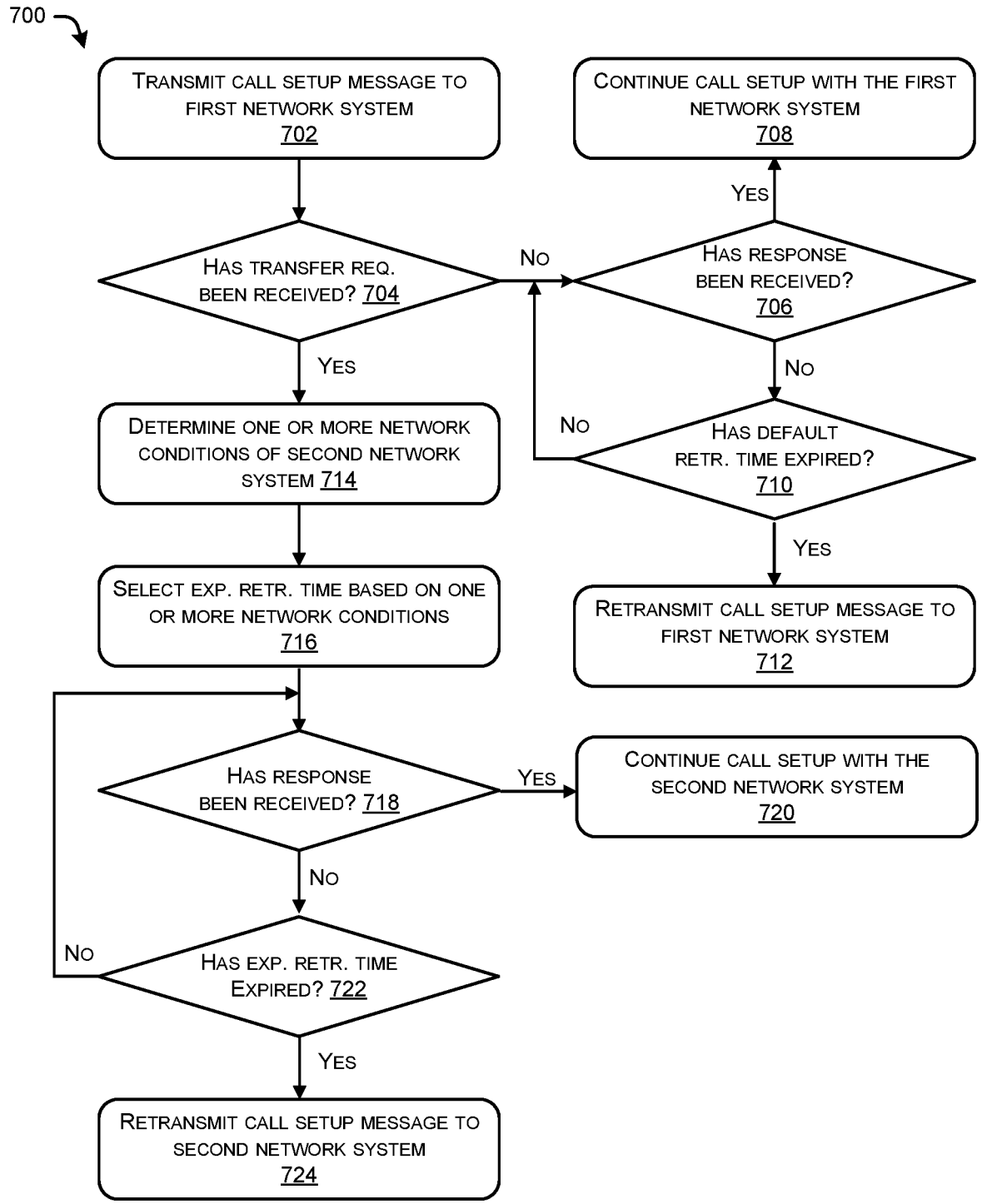
FIG. 7 illustrates a process for selectively implementing an expedited retransmission time when a call is transferred during call setup according to various implementations.

FIGS. 5 to 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates a process 500 for implementing an expedited retransmission time during call setup, according to various implementations. In particular implementations, process 500 is performed by a User Equipment (UE), such as the first UE 102 or the second UE 206 described above with reference to FIGS. 1 and 2.

At 502, a call setup message is transmitted to a first network system. In particular implementations, the call setup message can be a SIP message.

The first network system may be associated with a first network access technology. In some examples, the first network system may utilize a $4^{th}$ Generation (4G) radio access technology, a $5^{th}$ Generation (5G) radio access technology, a Wi-Fi radio access technology, or any other radio access technology.

At 504, a transfer request is received from the first network system prior to expiration of a default retransmission time after the call setup message was transmitted. The transfer request may specify and/or indicate handover or redirection of the call to a second network system.

In various implementations, the second network system may be associated with a second network access technology. The second network access technology may be different from the first network access technology. In some examples, the second network system may utilize a $4^{th}$ Generation (4G) radio access technology, a $5^{th}$ Generation (5G) radio access technology, a Wi-Fi radio access technology, or any other radio access technology.

At 506, the call setup message is transmitted to the second network system upon expiration of an expedited retransmission time after the transfer request was received. The call setup message may be transmitted to the second network system via the second network access technology. In various implementations, the expedited retransmission time can be shorter than the default retransmission time. In some examples, the expedited retransmission time can be between zero seconds and one second. In particular examples, the expedited retransmission time is equivalent to a Round Trip Time (RTT) associated with the first network system.

According to various implementations, process 500 enables selective implementation of the expedited retransmission time in circumstances in which a call is transferred to a different network system during call setup. In these circumstances, a previously transmitted call setup message is likely to be lost and is likely to require retransmission. Accordingly, process 500 can speed up call setup without introducing additional retransmissions that would otherwise overburden the network.

FIG. 6 illustrates a process 600 for selecting an expedited retransmission time according to various implementations. In particular implementations, process 600 is performed by a User Equipment (UE), such as the first UE 102 or the second UE 204 described above with reference to FIGS. 1 and 2.

The process 600 includes determining to implement an expedited retransmission time at 602. In various implementations, the implementation of the expedited retransmission time may occur in response to determining that a call being setup is being handed over or redirected from a first network system to a second network system.

At 604, one or more network conditions are determined. The one or more network conditions may include a congestion level, an interference level, a time-of-day, and/or the like. The one or more network conditions may be conditions associated with the first network system, the second network system, or both.

At 606, the expedited retransmission time is selected based on the one or more network conditions. In some examples, the expedited retransmission time is selected to be proportional to the congestion level, the interference level or both. In certain cases, the expedited retransmission time is selected to be relatively long when the process 600 is occurring during a time-of-day typically associated with relatively high data traffic. In various implementations, the expedited retransmission time is selected to be shorter than a default retransmission time.

FIG. 7 illustrates a process 700 for selectively implementing an expedited retransmission time when a call is transferred during call setup. In particular implementations, process 700 is performed by a User Equipment (UE), such as the first UE 102 or the second UE 206 described above with reference to FIGS. 1 and 2.

At 702, a call setup message is transmitted to a first network system. In particular implementations, the call setup can be a Session Initiation Protocol (SIP) message.

The first network system may be associated with a first network access technology. In some examples, the first network system may utilize a $4^{th}$ Generation (4G) radio access technology, a $5^{th}$ Generation (5G) radio access technology, a Wi-Fi radio access technology, or any other radio access technology.

At 704, the process 700 includes determining whether a transfer request has been received. A transfer request may be received from the first network system, in some implementations. In particular examples, the transfer request may specify and/or indicate handover or redirection to a second network system that is different than the first network system. The second network system may utilize a different network access technology than the first network system. In some examples, the second network system may utilize a $4^{th}$ Generation (4G) radio access technology, a $5^{th}$ Generation (5G) radio access technology, a Wi-Fi radio access technology, or any other radio access technology.

If the transfer request is determined to have not been received at 704, the process 700 proceeds to 706. At 706, the process 700 includes determining whether a response has been received. The response may be received from the first network system as a response to the call setup message transmitted at 702. The response may be a SIP message, in some implementations.

If a response has been determined to have been received at 706, the process proceeds to 708. At 708, call setup is continued with the first network system. In some cases, the call setup may include transmitting and receiving additional call setup messages with the first network system.

If a response has been determined to have been received at 706, the process continues to 710. At 710, the process 700 includes determining whether a default retransmission time has expired. The default retransmission time may be measured from a time at which the call setup message was transmitted to the first network system at 702. In some implementations, the default retransmission time may be two seconds or longer.

If the default retransmission time has been determined to have expired at 710, the process 700 returns to 706.

If the default retransmission time has been determined to have expired at 710, the process 700 continues to 712. At 712, the call setup message is retransmitted to the first network system. Although not illustrated, in some cases, 712 can include repeating 702. Accordingly, in certain cases, the process 700 can be repeated upon reaching 712.

If, on the other hand, a transfer request has been determined to have been received at 704, the process 700 continues to 714. At 714, one or more network conditions of the second network system are determined. The one or more network conditions may include a congestion level, an interference level, a time-of-day, and/or the like. The one or more network conditions may be conditions associated with the first network system, the second network system, or both.

At 716, an expedited retransmission time is selected based on the one or more network conditions. In some examples, the expedited retransmission time is selected to be proportional to the congestion level, the interference level, or both. In certain cases, the expedited retransmission time is selected to be relatively long when the process 700 is occurring during a time-of-day typically associated with relatively high data traffic.

In various implementations, the expedited retransmission time is selected to be shorter than the default retransmission time. In some examples, the expedited retransmission time may be between zero seconds and two seconds, whereas the default retransmission time may be two seconds or greater.

At 718, the process 700 includes determining whether a response has been received. The response may be received from the first network system or the second network system, in some cases. The response may be a response to the call setup message transmitted at 702.

If the response is determined to have been received at 718, the process 700 continues to 720. At 720, call setup is continued with the second network system. The call setup may include transmitting and receiving additional call setup messages with the second network system, in some examples.

On the other hand, if the response is determined to have not been received at 718, the process 700 proceeds to 722. At 722, the process 700 includes determining whether the expedited retransmission time has expired. The expedited retransmission time may be measured from a time at which the transfer request was received.

If the expedited retransmission time is determined to have not expired at 722, the process 700 returns to 718. On the other hand, if the expedited retransmission time is determined to have expired at 722, the process 700 proceeds to 724. At 724, the call setup message is retransmitted to the second network system. Accordingly, call setup can proceed with the second network system.

Example Clauses

A: A method including: transmitting, to a first network system associated with a first network access technology, a call setup message; receiving, from the first network system, a transfer request indicating handover or redirection to a second network system associated with a second network access technology; and upon expiration of an expedited retransmission time after receiving the transfer request, retransmitting the call setup message to the second network system.

B. The method of A, wherein the call setup message includes a Session Initiation Protocol (SIP) message.

C. The method of claim A or B, wherein the call setup message comprises a includes acknowledgement (PRACK) message.

D. The method of any of A to C, wherein the transfer request is received within a default retransmission time after transmitting the call setup message, the default retransmission time being longer than the expedited retransmission time.

E. The method of any of A to D, wherein the expedited retransmission time is between zero seconds and one second.

F. The method of any of A to E, wherein the expedited retransmission time is a Round Trip Time (RTT) associated with the first network system.

G. The method of any of A to F, further including: in response to receiving the indication, selecting the expedited retransmission time based at least in part on one or both of a first condition of the first network system and a second condition of the second network system.

H The method of G, wherein the first condition includes at least one of a congestion level of the first network system, an interference level of the first network system, or a first time-of-day associated with the first network system, and wherein the second condition includes at least one of a congestion level of the second network system, an interference level of the second network system, or a second time-of-day associated with the second network system.

I. The method of any of A to H, wherein the first network access technology is a $4^{th}$ Generation (4G) radio access technology, a $5^{th}$ Generation (5G) radio access technology, or a Wi-Fi radio access technology, wherein the second network access technology is the 4G radio access technology, the 5G radio access technology, or the Wi-Fi radio access technology, and wherein the first network access technology is different than the second network access technology.

J. The method of claim any of A to I, further including: upon expiration of a default retransmission time after transmitting the call setup message, retransmitting the call setup message to the first network system, wherein the default retransmission time is longer than the expedited retransmission time.

K. A method including: transmitting, to a 5th Generation (5G) network system, a Session Initiation Protocol (SIP) message; receiving, from the 5G network system within a default retransmission time of transmitting the SIP message, a transfer request indicating handover or redirection to a 4th Generation (4G) network system; and upon expiration of an expedited retransmission time after receiving the indication, retransmitting the SIP message to the 4G network system.

L. A method of K wherein the default retransmission time is longer than the expedited retransmission time.

M. A method of K or L further including: in response to receiving the transfer request, selecting the expedited retransmission time based at least in part on a congestion level of the 4G network system, an interference level of the 4G network system, or a time-of-day in which the transfer request is received N. A User Equipment (UE) executing the method of any of A to M.

L. A system including: at least one processor; and at least one memory storing instructions, the instructions being executable by the at least one processor to perform operations including the method of any of A to M.

M. A non-transitory computer-readable medium storing instructions to perform the method of any of A to M.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   transmitting, to a first network system associated with a first network access technology, a call setup message;
   receiving, from the first network system, a transfer request indicating handover or redirection to a second network system associated with a second network access technology, the transfer request originating from the first network system;
   determining an expedited retransmission time measured from a time the transfer request was received has elapsed; and
   in response to the determining the expedited retransmission time measured from the time the transfer request was received has elapsed, retransmitting the call setup message to the second network system.

2. The method of claim 1, wherein the call setup message comprises a Session Initiation Protocol (SIP) message.

3. The method of claim 1, wherein the call setup message comprises a provisional acknowledgement (PRACK) message.

4. The method of claim 1, wherein the transfer request is received within a default retransmission time after transmitting the call setup message, the default retransmission time being longer than the expedited retransmission time.

5. The method of claim 1, wherein the expedited retransmission time is between zero seconds and one second.

6. The method of claim 1, wherein the expedited retransmission time is a Round Trip Time (RTT) associated with the first network system.

7. The method of claim 1, further comprising:
   in response to receiving the indication, selecting the expedited retransmission time based at least in part on one or both of a first condition of the first network system and a second condition of the second network system.

8. The method of claim 7, wherein the first condition comprises at least one of a congestion level of the first network system, an interference level of the first network system, or a first time-of-day associated with the first network system, and
   wherein the second condition comprises at least one of a congestion level of the second network system, an interference level of the second network system, or a second time-of-day associated with the second network system.

9. The method of claim 1, wherein the first network access technology is a $4^{th}$ Generation (4G) radio access technology, a $5^{th}$ Generation (5G) radio access technology, or a Wi-Fi radio access technology,
   wherein the second network access technology is the 4G radio access technology, the 5G radio access technology, or the Wi-Fi radio access technology, and
   wherein the first network access technology is different than the second network access technology.

10. The method of claim 1, wherein the call setup message is a second call setup message, the method further comprising:
    prior to the transmitting of the second call setup message:
       transmitting, to the first network system associated with the first network access technology, a first call setup message; and
       upon expiration of a default retransmission time after transmitting the first call setup message, performing the transmitting of the second call setup message to the first network system,
    wherein the default retransmission time is longer than the expedited retransmission time.

11. A system comprising:
    at least one processor; and
    at least one memory storing instructions, the instructions being executable by the at least one processor to perform operations comprising:
       transmitting, to a first network system associated with a first network access technology, a call setup message;
       receiving, from the first network system, a transfer request indicating handover or redirection to a second network system associated with a second network access technology, the transfer request originating from the first network system;
       determining an expedited retransmission time measured from a time the transfer request was received has elapsed; and
       in response to the determining the expedited retransmission time measured from the time the transfer request was received has elapsed, retransmitting the call setup message to the second network system.

12. The system of claim 11, wherein the call setup message comprises a Session Initiation Protocol (SIP) message.

13. The system of claim 11, wherein the transfer request is received within a default retransmission time after transmitting the call setup message, the default retransmission time being longer than the expedited retransmission time.

14. The system of claim 11, wherein the operations further comprise:
    in response to receiving the transfer request, selecting the expedited retransmission time based at least in part on one or both of a first condition of the first network system and a second condition of the second network system.

15. The system of claim 14, wherein the first condition comprises at least one of a congestion level of the first network system, an interference level of the first network system, or a first time-of-day associated with the first network system, and wherein the second condition comprises at least one of a congestion level of the second network system, an interference level of the second network system, or a second time-of-day associated with the second network system.

16. The system of claim 11, wherein the expedited retransmission time is between zero seconds and one second.

17. The system of claim 11, wherein the first network access technology is a 4$^{th}$ Generation (4G) radio access technology, a 5$^{th}$ Generation (5G) radio access technology, or a Wi-Fi radio access technology,
wherein the second network access technology is the 4G radio access technology, the 5G radio access technology, or the Wi-Fi radio access technology, and
wherein the first network access technology is different than the second network access technology.

18. A User Equipment (UE) comprising:
at least one processor; and
at least one memory storing instructions, the instructions being executable by the at least one processor to perform operations comprising:
transmitting, to a 5$^{th}$ Generation (5G) network system, a Session Initiation Protocol (SIP) message;
receiving, from the 5G network system within a default retransmission time of transmitting the SIP message, a transfer request indicating handover or redirection to a 4$^{th}$ Generation (4G) network system, the transfer request originating from the 5G network system;
determining an expedited retransmission time measured from a time the transfer request was received has elapsed; and
in response to the determining the expedited retransmission time measured from the time the transfer request was received has elapsed, retransmitting the SIP message to the 4G network system.

19. The UE of claim 18, wherein the default retransmission time is longer than the expedited retransmission time.

20. The UE of claim 18, wherein the operations further comprise:
in response to receiving the transfer request, selecting the expedited retransmission time period based at least in part on a congestion level of the 4G network system, an interference level of the 4G network system, or a time-of-day in which the transfer request is received.

* * * * *